United States Patent [19]
Nichols

[11] Patent Number: 5,120,194
[45] Date of Patent: Jun. 9, 1992

[54] HYDRAULIC/PNEUMATIC TURBINE TRANSMISSION

[76] Inventor: Jeffrey Nichols, 190 Aulbach Ave., Mountain Home, Id. 83647

[21] Appl. No.: 478,663

[22] Filed: Feb. 12, 1990

[51] Int. Cl.⁵ .......................................... F01D 17/00
[52] U.S. Cl. .................................. 415/167; 415/202; 416/193 R
[58] Field of Search ................ 415/202, 83, 84, 85, 415/86, 126, 167; 416/193 R

[56] References Cited

U.S. PATENT DOCUMENTS

| | | | |
|---|---|---|---|
| 657,590 | 9/1900 | Couture | 415/85 |
| 870,292 | 11/1907 | Henry, Jr. | 415/167 |
| 4,141,672 | 2/1979 | Wieland et al. | 415/202 |
| 4,624,110 | 11/1986 | Levites | 60/670 |
| 4,958,986 | 9/1990 | Boussuges | 415/202 |

FOREIGN PATENT DOCUMENTS

| 1082979 | 3/1984 | U.S.S.R. | 415/167 |
|---|---|---|---|

*Primary Examiner*—Edward K. Look
*Assistant Examiner*—Hoang Nguyen
*Attorney, Agent, or Firm*—Frank J. Dykas; Craig M. Korfanta; Ken J. Pedersen

[57] ABSTRACT

A hydraulic/pneumatic turbine transmission (10) for converting a pressurized fluid source (26) to rotary motion of variable torque and rpm is disclosed. Turbine transmission (10) generally has housing (12) including main body housing (12a) and front housing cover plate (12b). An output shaft (11) is rotatably secured within housing (12) and has a main turbine runner (16) radially attached thereto. Main turbine runner (16) includes a plurality of concentrically disposed subrunners of progressively smaller diameter. A pair of diametrically disposed variable position nozzles are provided and disposed within housing (12) to selectively supply pressurized fluid to any one of the plurality of subrunners. A plurality of arcuate scavenge ports (33) are provided within housing (12) to allow a pressurized fluid to exit subsequent to impact on main turbine runner (16). Variable position nozzles (23) can be independently controlled to produce $2x-1$ output speeds, where x is equal to the number or subrunners.

5 Claims, 9 Drawing Sheets

FIG. 10

HYDRAULIC/PNEUMATIC TURBINE TRANSMISSION

BACKGROUND OF THE INVENTION

1. Technical Field

This invention generally relates to devices for converting hydraulic or pneumatic pressure sources to rotary motion and, in particular, this invention relates to a hydraulic/pneumatic transmission which uses a turbine-type assembly for direction selection and gearing.

2. Background Art

There exist many varied applications in which it is desirable to convert a hydraulic or pneumatic pressure source into rotary energy which can then be utilized to perform a specific task. The use of fluidics in power transfer is becoming more and more popular, due mainly to the simplicity and efficiency which fluidics can supply power for a particular application from a remote power plant.

A typical example of a pneumatic application might be in a mechanics shop which utilizes a centralized compressor to power a plurality of power tools. Hydraulic applications include large power tools, vehicles and hydraulic motors which subsequently power electrical generators, etc.

The purpose of a pneumatic or hydraulic motor is to convert a pressurized fluid source to a mechanical rotary output. Motor rpm is typically controlled with a fluid bypass mechanism which diverts a portion of the pressurized fluid to the return loop of the hydraulic system. This diverted energy is in effect wasted and does not contribute to the available torque or rpm of the mechanical rotation. A mechanical transmission must be used in connection with most hydraulic motors to obtain the maximum energy output at a given rpm.

A partial solution to the problem is offered by Levites, U.S. Pat. No. 4,624,110. Levites teaches a turbine/power transmission which selectively drives one of a plurality of turbine wheels to vary the torque and rpm of the output shaft. The various diameter turbine wheels, or runners, are radially attached to the drive shaft in side-by-side spaced relation. Levites teaches the use of a single pressurized fluid injector whose position can be shifted from turbine to turbine. The pressurized fluid enters each individual turbine wheel at its outside annular edge and is subsequently exhausted through a hollow output shaft. The number of available torque outputs is equal to the number of individual turbine runners. Obviously, the more distinct torque outputs a particular application requires, the larger the actual device becomes. No intermediate "gearing" is possible using the single pressurized fluid injector. Also, the Levites device is not well suited for higher viscosity fluids. Higher viscosity fluids typically require larger volume flow. The exhaust, or scavenge, configuration of Levites is necessarily small since it is disposed within the output shaft. Higher viscosity fluids are also more susceptible to centrifugal effects in the spinning turbine and naturally resist axial scavenging.

What is needed is a device for converting a pressurized fluid source, both hydraulic and pneumatic, to a rotary motion output having a large number of speed/torque settings while still maintaining reduced overall dimensions.

Accordingly, it is an object of the present invention to provide a transmission for converting pressurized hydraulic or pneumatic fluid to a rotational motion with a greater number of possible outputs and which is more compact and efficient than heretofore possible.

DISCLOSURE OF INVENTION

This, and other objects, are accomplished by a turbine transmission having a single turbine runner which includes a plurality of subrunners of progressively smaller diameter and a pair of variable position injector nozzles for injecting fluid to power the various subrunner assemblies. Hydraulic or pneumatic pressurized fluid is injected into the turbine runner by two variable position nozzle assemblies which are disposed 180 degrees apart. The transmission housing is configured to allow the pressurized fluid to work on any particular runner vein through a typical working arc of 90 degrees. The fluid is then exhausted or "scavenged" out an exhaust/scavenge port. The scavenge ports again extend through a 90 degree arc. The same cycle is repeated through the next 180 degrees. By independently positioning the two nozzle injectors, a large number of specific "gearing" possibilities can be accomplished. The lowest gear would correspond to both nozzles working on the largest diameter subrunner. Intermediate gearing can be accomplished by shifting one of the two nozzle injectors to a subrunner of a smaller diameter. For example, using only three subrunner assemblies, five distinct gearings are possible.

The present invention encompasses at least three separate embodiments. The first embodiment has the fluid injected at a front side of a particular runner assembly and scavenged out the back side. The second embodiment has the fluid injected from either the inside or outside edge of the subrunner and subsequently scavenged out the inside edge, the outside edge or the back side of the subrunner. An alternate embodiment includes a combination of the first two wherein one or more of the subrunners have pressurized fluid injected at a side edge while the other subrunners have the fluid injected at a front side.

BEST MODE FOR CARRYING OUT INVENTION

Figure 1:
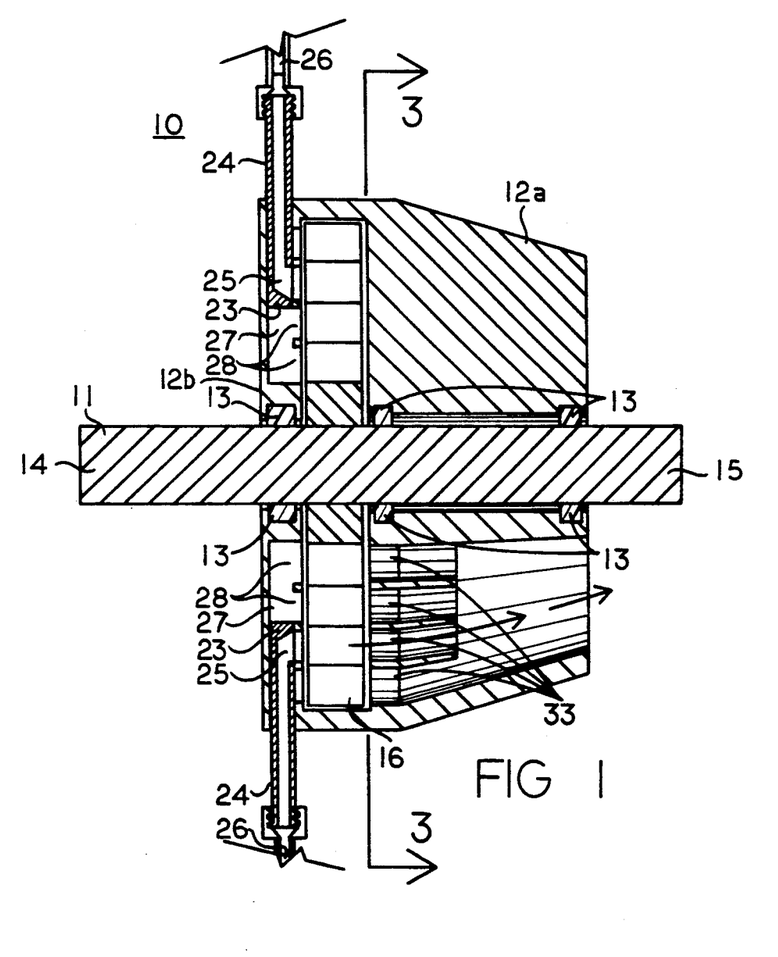
FIG. 1 is a side-sectional view of a first embodiment of a hydraulic/pneumatic turbine transmission.
Figure 2:
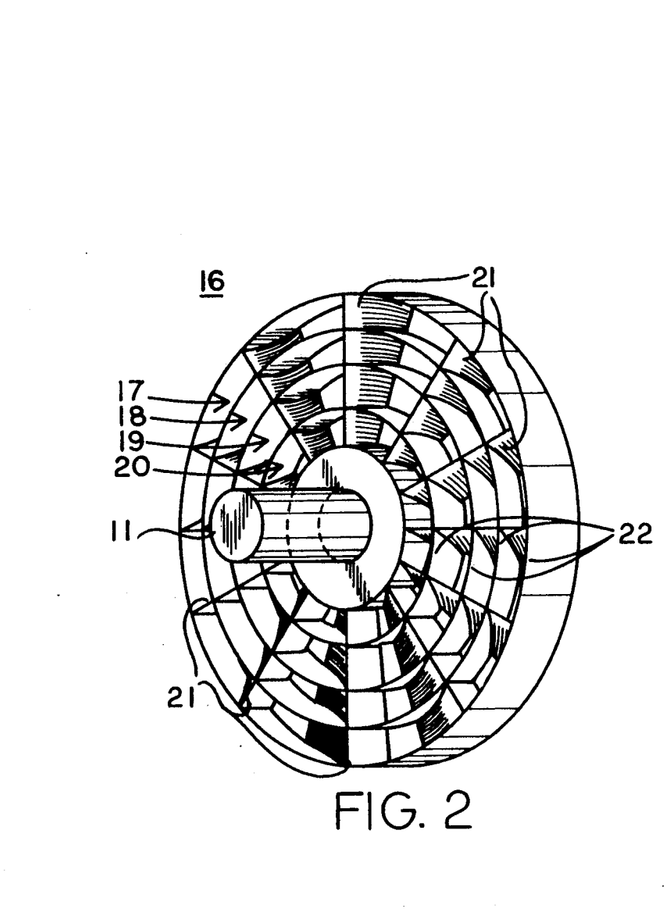
FIG. 2 is a perspective view of the main turbine runner assembly.
Figure 3:
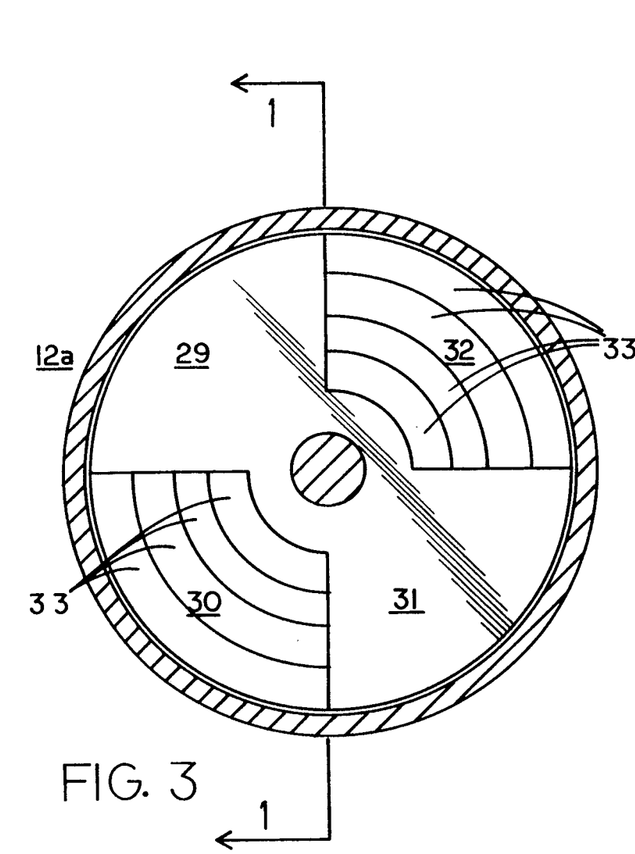
FIG. 3 is a sectional view of the turbine housing taken along section line 3 of FIG. 1.

A first embodiment of a variable speed hydraulic/pneumatic turbine transmission 10 is graphically depicted in FIGS. 1-3. Transmission 10 here has a cylindrical output shaft 11 being rotatably secured within housing 12 via suitable bearing seals 13. Housing 12, typically a cast metal alloy, has a main housing body 12a and a front housing cover plate 12b bolted or otherwise connected together. Here the first and second ends 14 and 15 of output shaft 11 extend outward from housing 12.

A main turbine runner 16 is radially attached to output shaft 11 and rotatably secured within housing 12. Main turbine runner 16 has a plurality of subrunners, here first subrunner 17, second subrunner 18, third subrunner 19 and fourth subrunner 20. Each subrunner is defined by a plurality of radially extending blades or vanes 21 and concentric vanes dividers 22. Radial blades 21 are shown in FIG. 2 having an arcuate cross section to provide a maximum working surface area to the incoming pressurized fluid. It should be noted however that the angle of the blades with respect to the concentric vane dividers 22 can be varied as can the cross sectional shape of both blades 21 and vane dividers 22.

A pair of variable position nozzles 23 are attached to the inner surface of front housing cover plate 12b and disposed 180° out of phase with respect to the main turbine runner 16. Each variable position nozzle 23 here consists of a nozzle tube 24 slidably engaged in a nozzle tube receiving channel 27. A nozzle tube outlet 25 is provided in the first end of each nozzle tube 24 while the second ends nozzle tubes 24 are connected to a pressurized hydraulic fluid source 26. A plurality of nozzle tube outlet orifices 28 are disposed within nozzle tube receiving channels 27 to align with nozzle tube outlets 25. Each nozzle tube outlet orifice 28 is additionally disposed radially juxtaposition a particular subrunner assembly to direct pressurized fluid at and through that particular subrunner. Additionally, a mechanical or electromechanical positioning means, not shown, is provided to move nozzle tubes 24 radially inward and outward with respect to main turbine runner 16. The positioning means also incorporates a registration system whereby each nozzle tube 24 will naturally be aligned with the nozzle tube outlet orifice 28 and not at some intermediate point.

In this embodiment, nozzles 23 are diametrically disposed 180° apart and are configured to be simultaneously juxtaposition on the same subrunner. Obviously, the number of available speeds is therefore equal to the number of individual subrunners.

An alternative embodiment has each nozzle 23 operated independently from the other so that they can be simultaneously positioned on adjacent subrunners. This alternative embodiment provides 2x−1 speeds, where x is equal to the number of subrunners. For the four subrunner assembly of FIGS. 1-3, this translates into seven available output speeds. The table below is a set of possible combinations for producing seven distinct speeds.

| FIRST NOZZLE POSITION | SECOND NOZZLE POSITION | OUTPUT SPEED |
| --- | --- | --- |
| First subrunner | First subrunner | 1 |
| First subrunner | Second subrunner | 2 |
| Second subrunner | Second subrunner | 3 |
| Second subrunner | Third subrunner | 4 |
| Third subrunner | Third subrunner | 5 |
| Third subrunner | Fourth subrunner | 6 |
| Fourth subrunner | Fourth subrunner | 7 |

Referring particularly to FIG. 3, the configuration of the cavity which houses the main turbine runner assembly is illustrated. In this particular configuration, the variable position nozzles of FIG. 1 would lie coincident upon the vertical section line 1 of FIG. 3. With the blade configuration of FIG. 2 and the nozzle configuration of FIG. 1, it should be apparent that the turbine transmission will here provide a counterclockwise rotation. To provide a clockwise rotation, one simply has to position the nozzles along a horizontal line and reverse the disposition of the runner blades. When fluid is injected at diametric points along vertical section line 1, it is allowed to work against the runner blades through the first working quadrant 29 and second working quadrant 31. The fluid is subsequently scavenged out a second side of the main turbine runner through a plurality of arcuate scavenge ports 33 of progressively smaller radii through a first scavenge quadrant 30 and second scavenge quadrant 32.

Referring now to FIGS. 4-9, a second embodiment of the variable speed hydraulic/pneumatic turbine transmission 100 is shown. Similar to the first embodiment, output shaft 101 is rotatably secured within housing 102 via suitable bearing seals 103. Again housing 102 is manufactured from two parts, main housing body 102a and front housing cover plate 102b to permit assembly and servicing of transmission 100. Output shaft 101 includes a first end 104 and a second end 105, both of which extend outward from housing 102.

Figure 4:
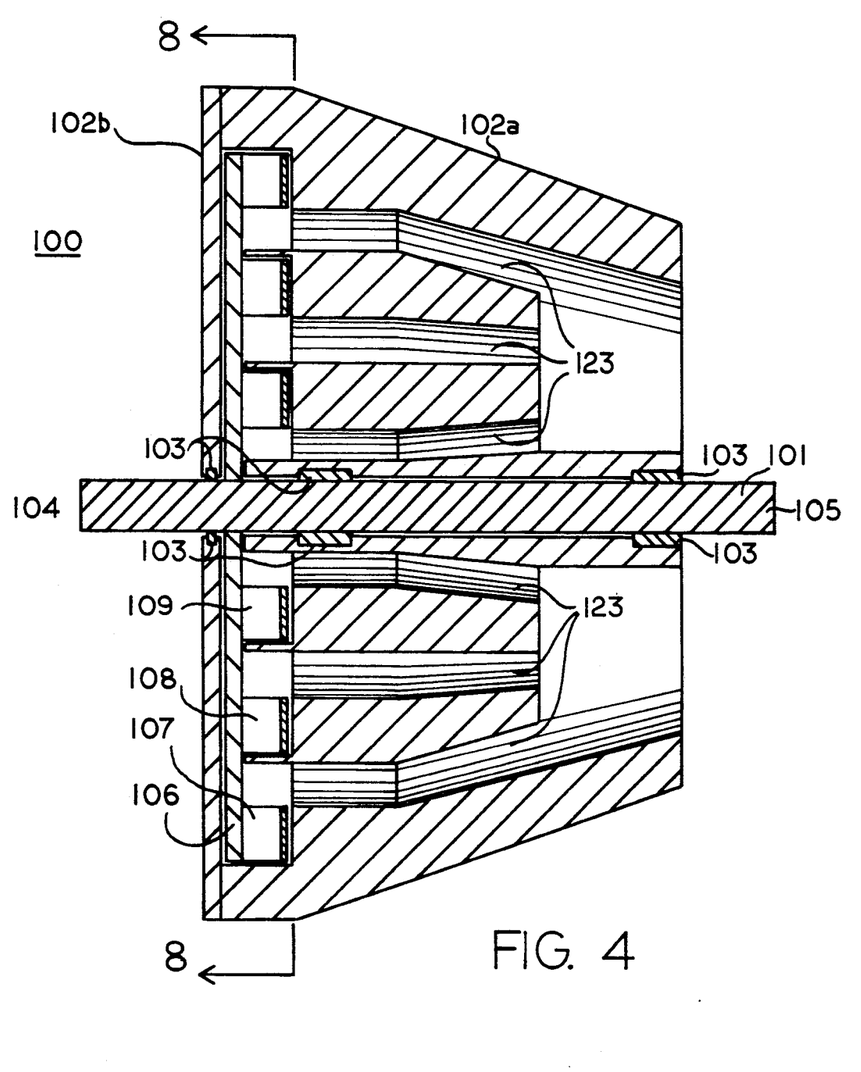
FIG. 4 is a side sectional view of a second embodiment of the present invention.
Figure 5:
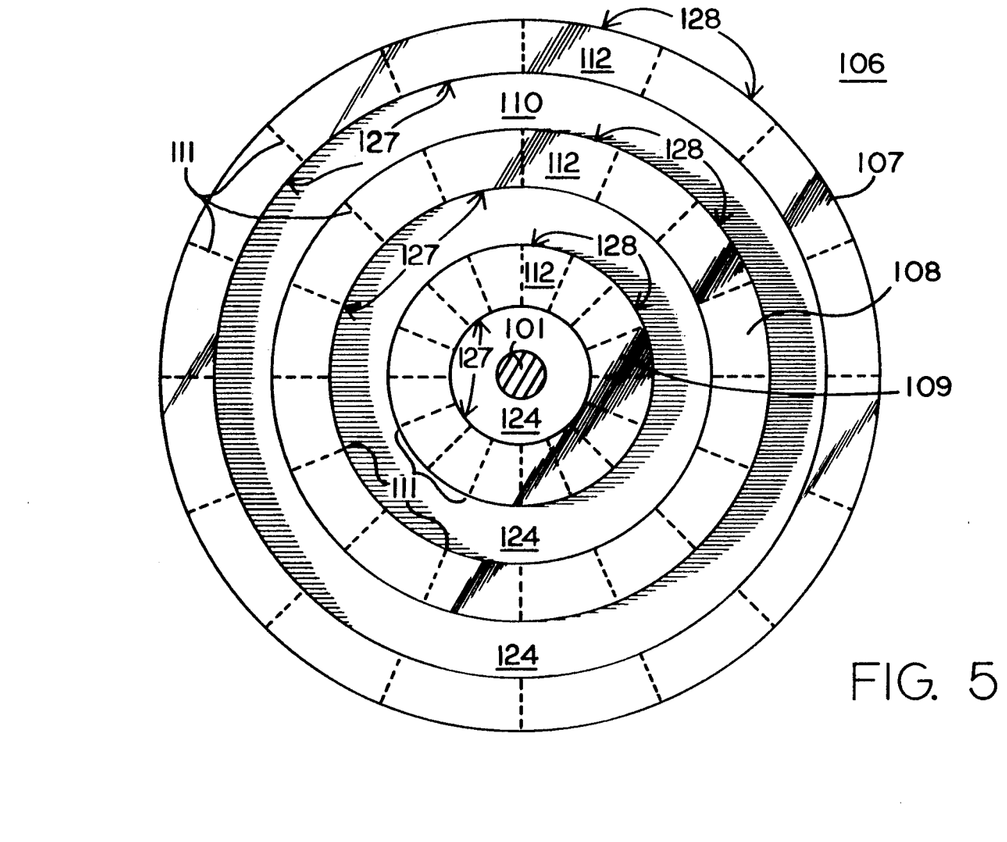
FIG. 5 is a plan view of a second main turbine runner assembly.

The primary distinction between the first embodiment and this second embodiment is in the construction configuration of main turbine runner 106. Main turbine runner 106 again has a plurality of subrunners, here first subrunner 107, second subrunner 108, and third subrunner 109. However, first, second, and third subrunners 107, 108, and 109, are disposed in concentrically spaced relationship one to the other to define a plurality of concentric scavenge rings 124 therebetween. Each of the subrunners has a plurality of radial blade segments attached on one edge in circular arrays to main runner plate 110. Each circular array is also attached along the opposing edge of radial blade segments 111 to concentric blade positioning rings 112.

Figure 6:
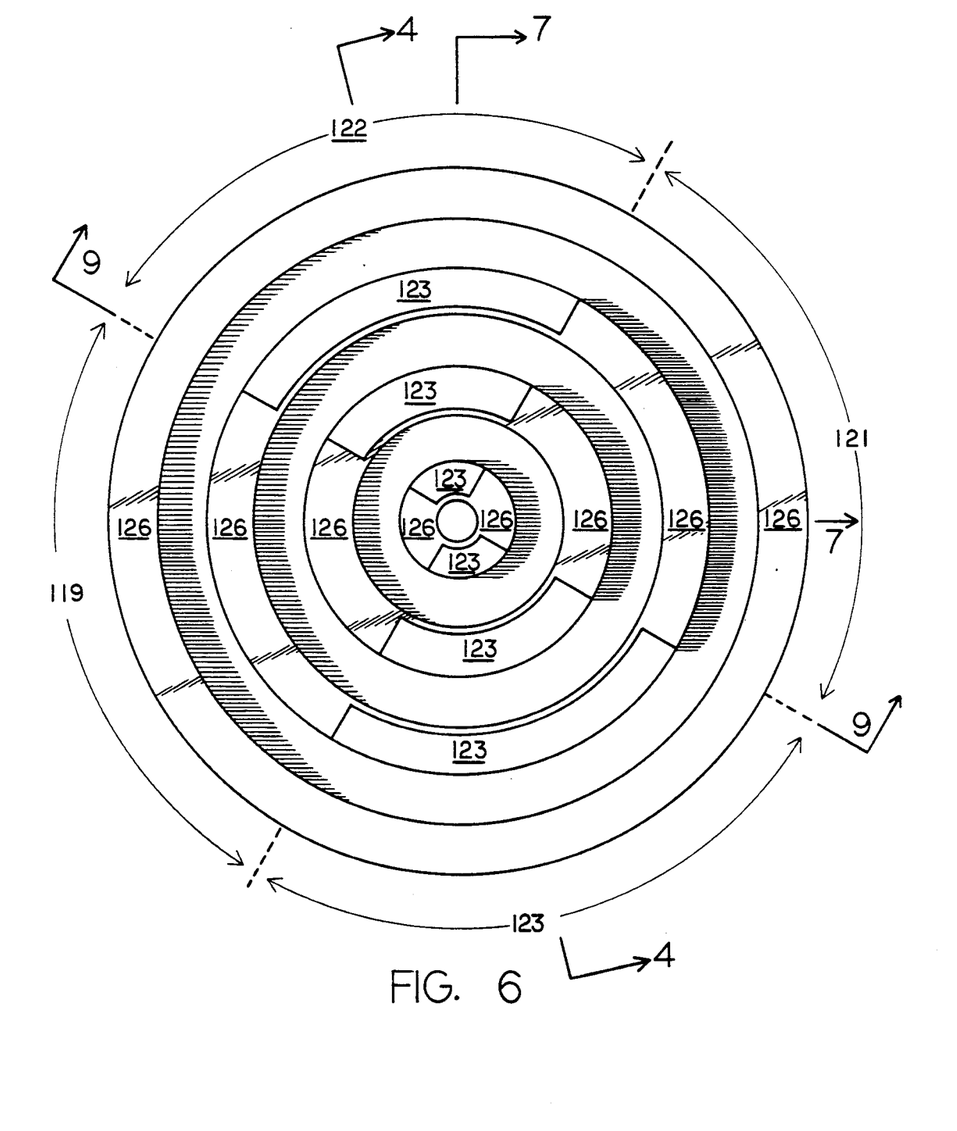
FIG. 6 is a front plan view of the housing of the second embodiment, having the front cover plate and main turbine runner assembly removed.
Figure 7:
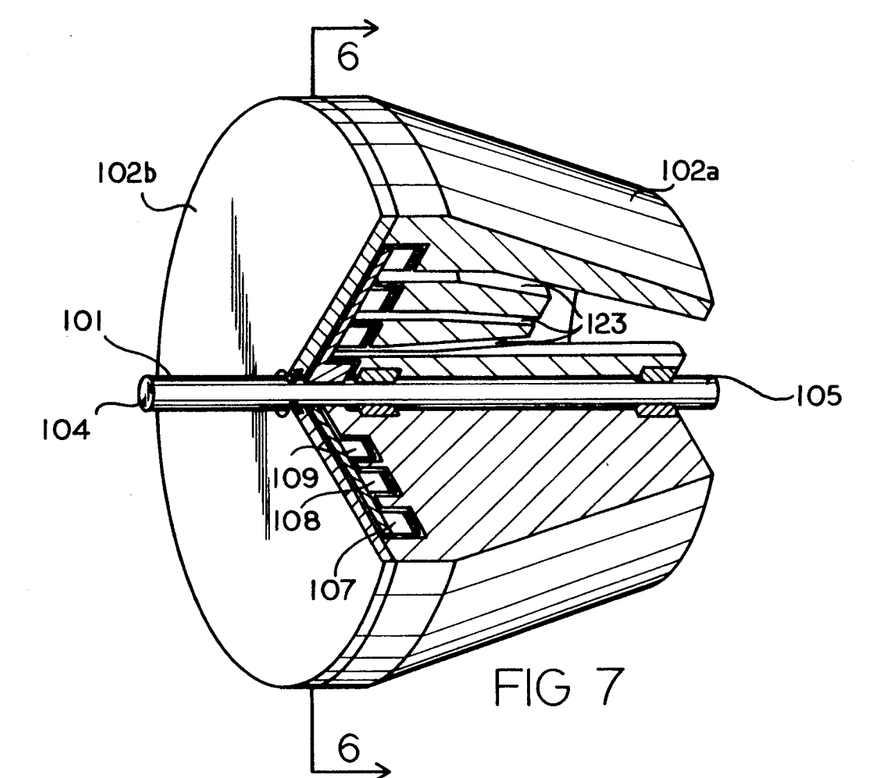
FIG. 7 is a perspective sectional view of the second turbine housing.

Main housing body 102a has formed therein a toriodal runner receiving recess 125 which includes a plurality of arcuate scavenge dividers 126. Arcuate scavenge dividers 126 are positioned in first working quadrant 119 and second working quadrant 121. Starting from the outside diameter and working in, each arcuate scavenge divider 126 is constructed having a progressively smaller radii and disposed to engage with the concentric scavenge rings 124 in main turbine runner 106.

Similarly, a plurality of arcuate scavenge ports 123 of progressively smaller radii are disposed in both the first scavenge quadrant 120 and second scavenge quadrant 122. By dividing toriodal runner receiving recess 125 into two working quadrants and two scavenge quadrants, the pressurized fluid is allowed to work through 180° and exhaust through 180°. It should be noted however, that the number of degrees that the fluid is allowed to work through is dependent upon the efficiency of the exhaust or scavenge process. It may be possible to significantly increase the number of degrees which the fluid is allowed to work for each point of pressurized fluid injection by making the scavenge process more efficient, which would reduce the number of degrees necessary for the scavenge process and leave more working area for the fluid. A description of an alternate design of the second embodiment which includes a modification to make the scavenge process more efficient follows the description of this second embodiment.

Figure 8:
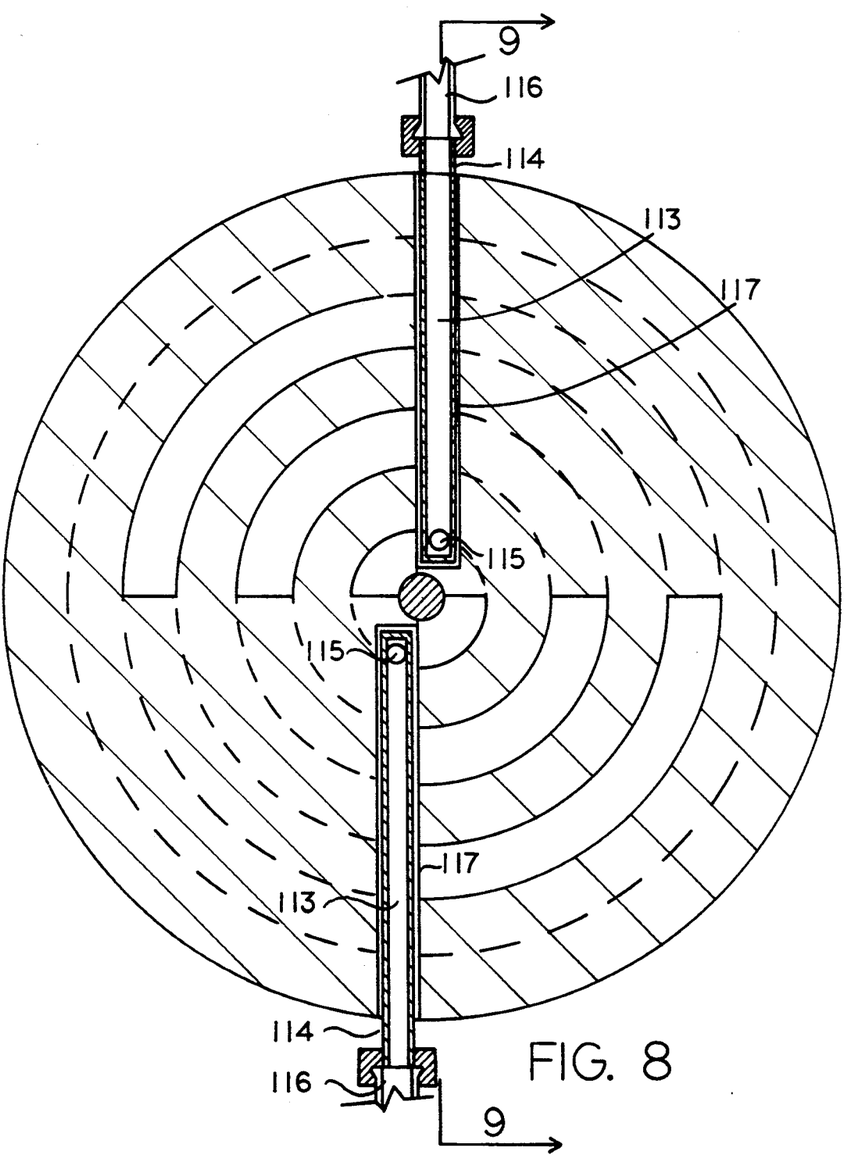
FIG. 8 is a side sectional view taken along section line 8 of FIG. 4.
Figure 9:
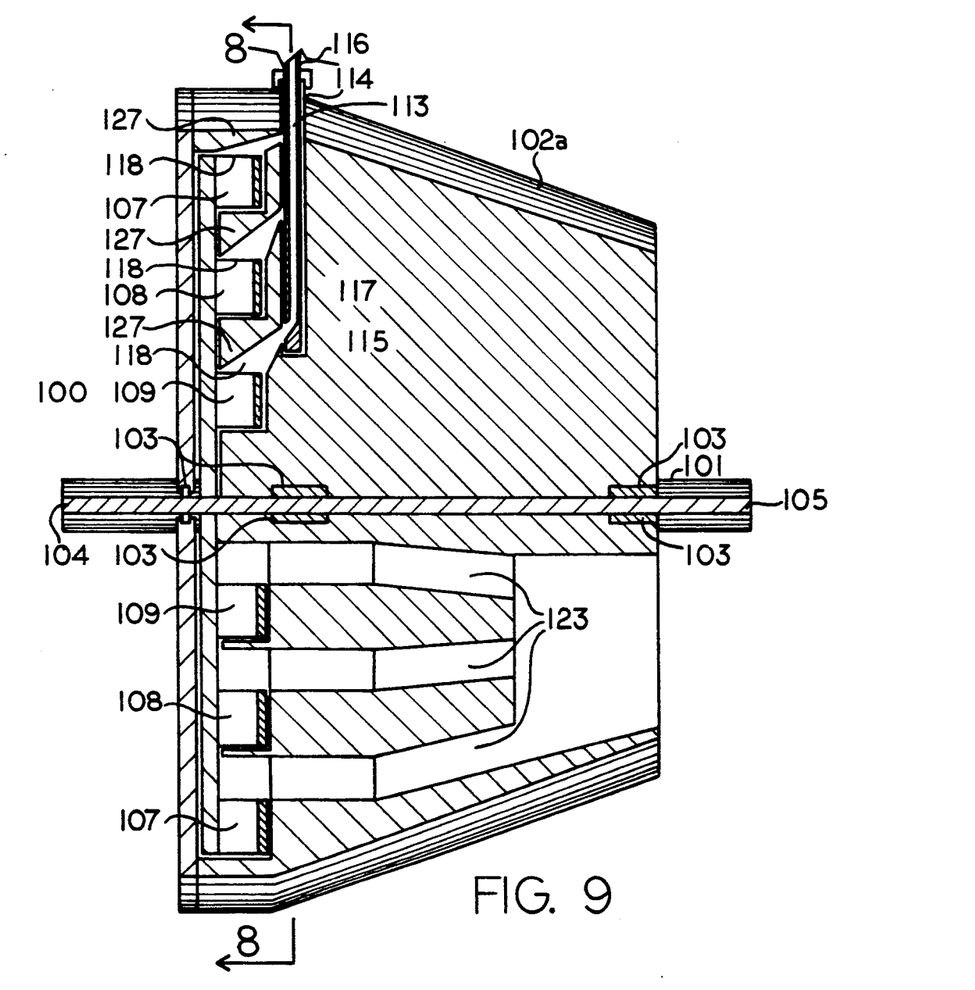
FIG. 9 is a side sectional view taken along section line 9 of FIGS. 6 and 8.

The following explanation will limit its description to a pair of nozzle assemblies, it being understood that the principles apply to any number of nozzle assemblies. FIGS. 8 and 9 show the details of the variable position nozzle assembly 113. Each variable position nozzle 113 has a nozzle tube 114 slidably received by nozzle tube receiving channels 117. Here, two nozzle tube receiving channels 117 are formed within main housing body 102a and disposed radially 180° apart. Each nozzle tube 114 is connected to a pressurized fluid source 116 at one end and has a nozzle tube outlet 115 at its other end. A plurality of nozzle tube outlet orifices 118 are positioned to inject pressurized fluid at an annularly outward point on an edge of each subrunner and subsequently scavenged or exhausted out the annularly inward edge of that particular subrunner. Here the number of outlet orifices 118 for each nozzle assembly 113, are equal to the number of subrunners. Each nozzle outlet orifice 118 is supplied by a separate nozzle outlet channel 127, where each of these are disposed to receive pressurized fluid from nozzle tube outlet 115. Again a separate mechanical or electromechanical positioning means is provided to position nozzle tubes 114 within nozzle tube receiving channels 117. By positioning nozzles 113 independently, five distinct gearing ratios can be accomplished with this second embodiment.

Figure 10:
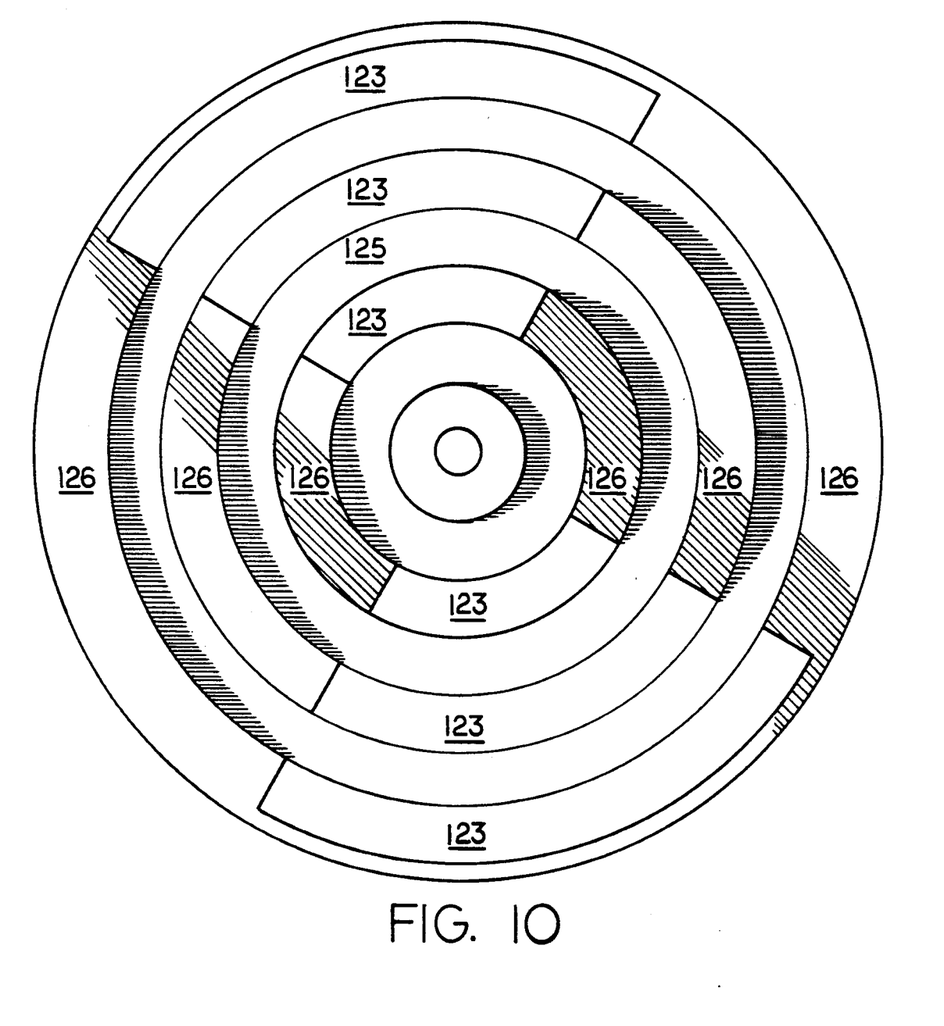
FIG. 10 is an analogous view to that of FIG. 6 for an alternate design of the second embodiment of the instant invention having an annularly outward scavenge configuration.

Referring now to FIG. 10, a third possible configuration of toroidal runner receiving recess 125 is shown. Here the turbine transmission has the pressurized fluid injected at an annularly inward edge of each subrunner, depicted in FIG. 5 at 127, and is then subsequently scavenged out the annularly outward edge, depicted at 128 in FIG. 5. This embodiment takes advantage of the centrifugal effects to promote and increase scavenge and working efficiency. Depending upon the efficiency of the scavenge process, it might be possible to add additional nozzle assemblies to extend the working arch in excess of 180° and limit the scavenged "arch" to less than 180°.

The third embodiment includes a combination of the first embodiment, where the nozzle orifice is disposed radially juxtapositioned to a particular subrunner assembly to direct pressurized fluid at and through that particular subrunner, and the second embodiment, where the nozzle orifice is positioned to inject pressurized fluid at an annularly outward point on an edge of each subrunner and subsequently scavenged or exhausted out the annularly inward face of that particular subrunner and vice-versa.

While there is shown and described the present preferred embodiment of the invention, it is to be distinctly understood that this invention is not limited thereto but may be variously embodied to practice within the scope of the following claims.

Accordingly, what is claimed is:
1. A hydraulic/pneumatic turbine transmission for converting a pressurized fluid source to rotary motion of variable torque and rpm which comprises:
   a housing;
   an output shaft being rotatably secured within said housing and having a first end and a second end, wherein said second end extends outward from said housing;
   a main turbine runner being radially attached to the first end of said output shaft and having a plurality of concentrically disposed subrunners of progressively smaller diameters;
   said main turbine runner having said subrunners disposed in concentrically spaced relationship, one to the other, to define concentric scavenge rings therebetween;
   variable position nozzle means being connected to the pressurized fluid source and disposed within said housing for selectively supplying pressurized fluid to any one of the plurality of subrunners, thereby inducing rotary motion of said main turbine runner and said output shaft;
   a plurality of arcuate scavenge dividers being attached to said housing and disposed to engage said concentric scavenge rings through a first limited arc of travel of said main turbine runner; and
   said housing having a plurality of scavenge ports being disposed juxtaposition said concentric scavenge rings through a second limited arc of travel of said main turbine runner for directing the pressurized fluid away from said main turbine runner and out of said housing after the pressurized fluid has contacted any one of said subrunners.

2. The transmission of claim 1 wherein said nozzle means is disposed to selectively inject pressurized fluid at an annularly outward point on an edge of each of said subrunners and the presurized fluid is subsequently scavenged out an annularly inward scavenge port.

3. The transmission of claim 1 wherein said nozzle means is disposed to selectively inject pressurized fluid at an annularly inward point on an edge of each of said subrunners and the pressurized fluid is subsequently scavenged out an annularly outward scavenge port.

4. A hydraulic/pneumatic turbine transmission for converting a pressurized fluid source to rotary motion of variable torque and rpm which comprises:
   a housing;
   an output shaft being rotatably secured within said housing and having a first end and a second end, wherein said second end extends outward from said housing;
   a main turbine runner being radially attached to the first end of said output shaft and having a plurality of concentrically disposed subrunners of progressively smaller diameters;
   said main turbine runner further having a plurality of circular subrunner dividers being concentrically disposed and being attached between adjacent subrunners;
   variable position nozzle means being connected to the pressurized fluid source and disposed within said housing for selectively supplying pressurized fluid to any one of the plurality of subrunners, thereby inducing rotary motion of said main turbine runner and said output shaft; and
   scavenge means including said housing having a plurality of scavenge ports therein disposed through a limited arc of travel of said main turbine runner and juxtaposition a first side of each subrunner for directing the pressurized fluid away from said main turbine runner and out of said housing after the pressurized fluid has contacted any one of said subrunners.

5. The transmission of claim 4 wherein said nozzle means is disposed to selectively inject pressurized fluid at a second side of each subrunner and the pressurized fluid is subsequently scavenged out a scavenge port juxtaposition the subrunner's first side.

* * * * *